United States Patent
Tanimura et al.

[11] Patent Number: 5,257,443
[45] Date of Patent: Nov. 2, 1993

[54] TRANSPORT SYSTEM FOR TIRE DEMOUNTING AND MOUNTING SERVICE OPERATIONS

[75] Inventors: Syuzo Tanimura; Tokio Kanatomi, both of Tokyo; Fumio Kamanoi, Ichikawa; Mitsuo Sato, Kodaira, all of Japan

[73] Assignee: Bridgestone Corporation, Tokyo, Japan

[21] Appl. No.: 972,845

[22] Filed: Nov. 6, 1992

[30] Foreign Application Priority Data

Nov. 26, 1991 [JP] Japan .................. 3-310846

[51] Int. Cl.$^5$ ............................. B23P 19/04
[52] U.S. Cl. ..................... 29/33 R; 29/705; 414/426
[58] Field of Search ............... 29/33 R, 563, 564, 705, 29/704, 244, 245, 235, 273, 787, 824, 728; 81/57.22, 57.23; 414/426, 427, 428, 626

[56] References Cited

U.S. PATENT DOCUMENTS

| | | | |
|---|---|---|---|
| 3,491,427 | 1/1970 | Zimmerman et al. | 414/426 X |
| 3,830,387 | 8/1974 | Virnig | 29/273 X |
| 4,635,339 | 1/1987 | Kozlowski | 29/794 X |
| 4,841,632 | 6/1989 | Namiki et al. | 29/787 |
| 4,909,105 | 3/1990 | Namiki et al. | 81/57.22 X |
| 4,942,659 | 7/1990 | Sakurai | 29/705 |
| 5,125,298 | 6/1992 | Smith | 29/728 X |
| 5,167,065 | 12/1992 | Koga | 29/824 |

FOREIGN PATENT DOCUMENTS

| | | | |
|---|---|---|---|
| 2210198 | 9/1973 | Fed. Rep. of Germany | 414/428 |
| 12515 | 1/1986 | Japan | 414/427 |
| 120281 | 6/1987 | Japan | 29/705 |
| 122872 | 6/1987 | Japan | 29/705 |
| 279940 | 11/1988 | Japan | 414/426 |
| 1-69303 | 6/1990 | Japan | 414/426 |

*Primary Examiner*—William Briggs
*Attorney, Agent, or Firm*—Oliff & Berridge

[57] ABSTRACT

A nut runner can be moved along fixed rails and a moving rail. A tire, after being removed by using the nut runner, is supported on a tire dolly, and the tire is transported to an outer rail. Here, the tire is held by a hanger, and is transported to an operating machine. A movable block is provided with a sensor, and a plurality of stop points are set in each rail. Upon completion of the operation by the operating machine, the tire is held again by the hanger, and is transported to a predetermined position along the outer rail. The tire is then supported on the tire dolly, and is temporarily fixed to a vehicle. In this state, the nut runner is moved, and nuts are tightened by means of this nut runner, thereby completing the tire demounting and mounting operation.

20 Claims, 9 Drawing Sheets

TRANSPORT SYSTEM FOR TIRE DEMOUNTING AND MOUNTING SERVICE OPERATIONS

BACKGROUND OF THE INVENTION

1. Field of the Invention

The present invention relates to a transport system for tire demounting and mounting service operations, which is installed in a working area where tire demounting and mounting services,, including tire replacement, repair, inflation, and rotation of tires of a vehicle, are performed with operating machines, so as to transport the tire between the operating machines and the vehicle.

2. Description of the Related Art

When the operation of removing and fitting a tire is performed for repairing a punctured tire of a vehicle, particularly a truck or a bus (hereinafter generally referred to as a large vehicle), for changing the tire with a new one, or for effecting the rotation of tires, a pneumatic impact wrench, which is stored in advance at a predetermined position, is carried to a tire fitting position of the large vehicle with the large vehicle jacked up. Since the impact wrench is heavy, the impact wrench is sometimes carried in a state in which it is suspended from a crawler-type impact-wrench suspending machine.

By using this impact wrench, the operator consecutively loosens a plurality of (usually 8 to 10) wheel nuts so as to set the tire in a removable state. Then, the operator removes the tire from the large vehicle while holding it in the operator's hands, and manually rolls the tire to move the tire to a place where a tire changer and an inflator are located. Then, the tire is filled with a predetermined amount of air by the inflator.

When these operations using the operating machines are finished, the tire is manually rolled so as to be transported to the tire fitting position of the large vehicle, and the tire is fitted. After the tire is fitted, the plurality of nuts are consecutively tightened again, and the tire demounting and mounting operation is thereby completed.

However, the above-described conventional operations involved much labor by the operator. In addition, when the tire is fitted, the bolts (inner nuts in the case of a double tire) must be positioned such that they can be inserted into wheel tightening holes, so that an experts' perception and knack are required. Furthermore, since the tire is often held in the operator's arms, the working clothes can be stained or damaged.

In particular, since tires of large vehicles weigh 100 kg or more per unit, and the number of tires to be fitted is large, the operating efficiency in demounting and mounting of the tires has been very poor.

In addition, since pneumatic impact wrenches are used in the conventional operation, the noise is large, and since air pipes are required, the working space becomes limited in space.

SUMMARY OF THE INVENTION

In view of the above-described circumstances, it is an object of the present invention to provide a transport system for tire demounting and mounting service operations, in which operations involved in tire demounting and mounting and tire transporting operations are systematized so as to alleviate the operator'labor and improve the operating efficiency.

To this end, in accordance with one aspect of the present invention, there is provided a transport system for tire demounting and mounting service operations, which is installed in a working area where tire demounting and mounting services, including tire replacement, repair, inflation, and rotation of tires of a vehicle, are performed with operating machines, so as to transport the tire between the operating machines and the vehicle, the system comprising: a nut runner for rotating working-mounting nuts for demounting or mounting the tire of the vehicle; a first guiding device located upwardly of the vehicle located in the working area and adapted to allow the nut runner to be moved to a position in which the tire of the vehicle can be demounted or mounted, by suspending the nut runner; a hanger for holding the tire removed from the vehicle by means of the nut runner and the tire to be mounted on the vehicle by means of the nut runner; a second guiding device arranged around an outer periphery of the first guiding device and adapted to hold the hanger to render movable the hanger along an outer periphery of the vehicle; and a tire dolly disposed movably between the vehicle and the hanger and adapted to transport the tire removed from the vehicle by means of the nut runner and the tire to be mounted on the vehicle by means of the nut runner.

In accordance with the above-described aspect of the invention, the first guiding device is disposed around the outer periphery of the vehicle, and since the nut runner can be moved along this first guiding device, the nut runner can be moved smoothly and easily to the position in which the tire can be demounted or mounted. The tire dolly is caused to be located under the tire with the vehicle jacked up, and the wheel nuts are removed by means of the nut runner. After removal of the wheel nuts, since the tire is supported by the tire dolly, the tire can be removed from the wheel-mounting bolts by moving the tire dolly along an extension of an axle. Then, the tire dolly transports the tire to a position on the floor surface corresponding to a position where the second guiding device is disposed. Here, the tire is supported by the hanger suspended from the second guiding device, and is moved along the second guiding device. As a result, the tire can be transported to operating machines such as a tire changer and an inflator. Upon completion of the operation by the operating machines, the tire is held again by the hanger, and is transported to a predetermined position along the second guiding device. At this predetermined position, the tire is moved from the hanger to the tire dolly set on standby, so as to be supported by the tire dolly. The tire dolly is then moved so as to allow the tire to be received by the wheel-mounting bolts, and the wheel nuts are temporarily secured. In this state, the nut runner suspended from the first guiding device is moved, and the nuts are tightened by means of the nut runner, thereby completing the tire demounting and mounting operation. In accordance with the above-described operating procedure, since the tire can be demounted, transported, and mounted again without requiring much labor, such as transporting the tire by manually holding the tire, the working clothes are prevented from becoming stained or damaged. In addition, since the nut runner necessary for tire demounting and mounting is suspended from the first guiding device and is disposed in such a manner as to be movable along the first guiding device, there is no need to carry around the nut runner. Furthermore, since the demounting and mounting of the tire is effected while the tire is being supported by the tire dolly, expert skills are not required, so that the operating efficiency improves. Since the first and second guiding devices are arranged around the vehicle, the operation of demounting or mounting of any of the tires of the vehicle can be readily effected in the above-described procedure, and the tire rotation operation is also facilitated.

In accordance with another aspect of the invention, the transport system for tire demounting and mounting service operations may further comprise: a first driving device for driving the nut runner along the first guiding device; a second driving device for driving the hanger along the second guiding device; nut-runner-position detecting device for detecting that the nut runner has been moved to one of first-guiding-device stop points located on the first guiding device; a hanger-position detecting device for detecting that the hanger has been moved to one of second-guiding-device stop points located on the second guiding device; a designating device for designating the stop points for the nut runner and the hanger; and a controller for controlling the first driving device and the second driving device for moving the nut runner and the hanger to the stop points designated by the designating device.

In accordance with the above-described aspect of the invention, the first driving device is disposed in such a manner as to allow the nut runner to be movable along the first guiding device, while the second driving device is disposed in such a manner as to allow the hanger to be movable along the second guiding device. The first and second driving devices are controlled by the controller. In addition, since a plurality of stop points are set in the first and second guiding devices, and the arrival of the nut runner and the hanger at the stop points can be detected by the nut-runner-position detecting device and the hanger-position detecting device, respectively, the nut runner and the hanger can be automatically moved to designated stop points by controlling the first and second driving devices by means of the controller by simply designating the stop points by means of the designating device.

In addition, the transport system for tire demounting and mounting service operations further comprises a selecting the device for selecting shortest paths of movement from present stop positions of the nut runner and the hanger to the stop points designated by the designating means.

In accordance with the system of the invention arranged as described above, the shortest paths of movement of the nut runner and the hanger from their presently stopped positions to designated points are selected by the selecting device, and the nut runner and the hanger are moved along the shortest paths of movement selected. Consequently, the nut runner and the hanger can be moved speedily to the stop points, thereby making it possible to improve the operating efficiency.

In addition, in the transport system for tire demounting and mounting service operations, the operating machines such as the tire changer and the inflator are disposed alongside the path of movement of the hanger which moves along the second fixed rail.

In accordance with the system of the invention arranged as described above, since the manual transport of the tire by the operator is not required, and a working area exclusively used for a series of tire demounting and mounting operations is established, it is possible to obtain a working space in which the operator's labor is reduced, the staining of and damage to the working clothes are prevented, and the safety is improved.

As described above, the transport system for tire demounting and mounting service operations in accordance with the present invention offers outstanding advantages in that the operator's labor is alleviated, and the operating efficiency is improved by systematizing the operations involved in tire demounting and mounting and the tire transporting operation.

The other objects, features and advantages of the present invention will become more apparent from the following detailed description of the invention when read in conjunction with the accompanying drawings.

DESCRIPTION OF THE PREFERRED EMBODIMENT

Figure 1:
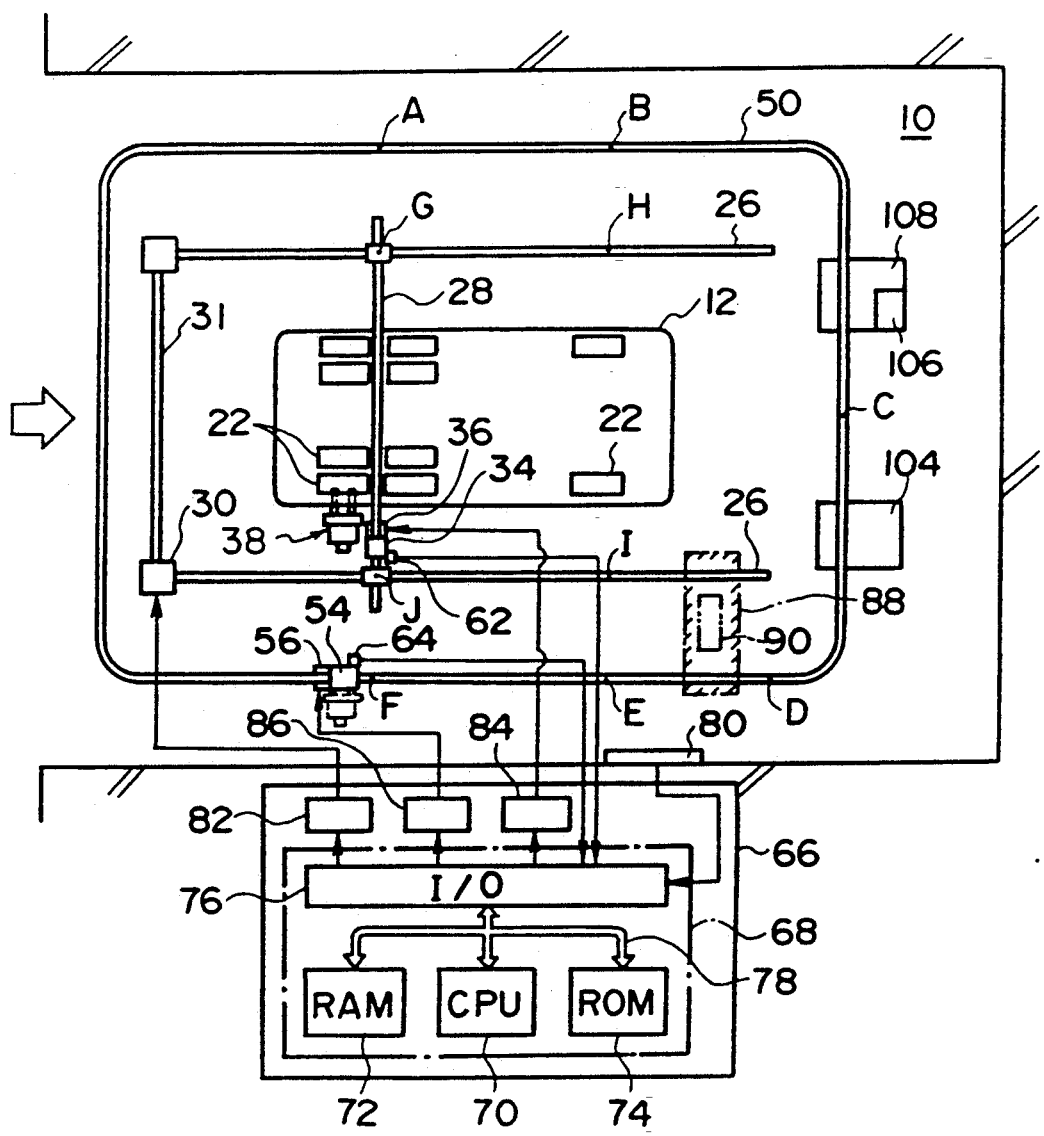
FIG. 1 is a plan view of a working area for tire demounting and mounting service operations in accordance with an embodiment of the present invention.
Figure 2:
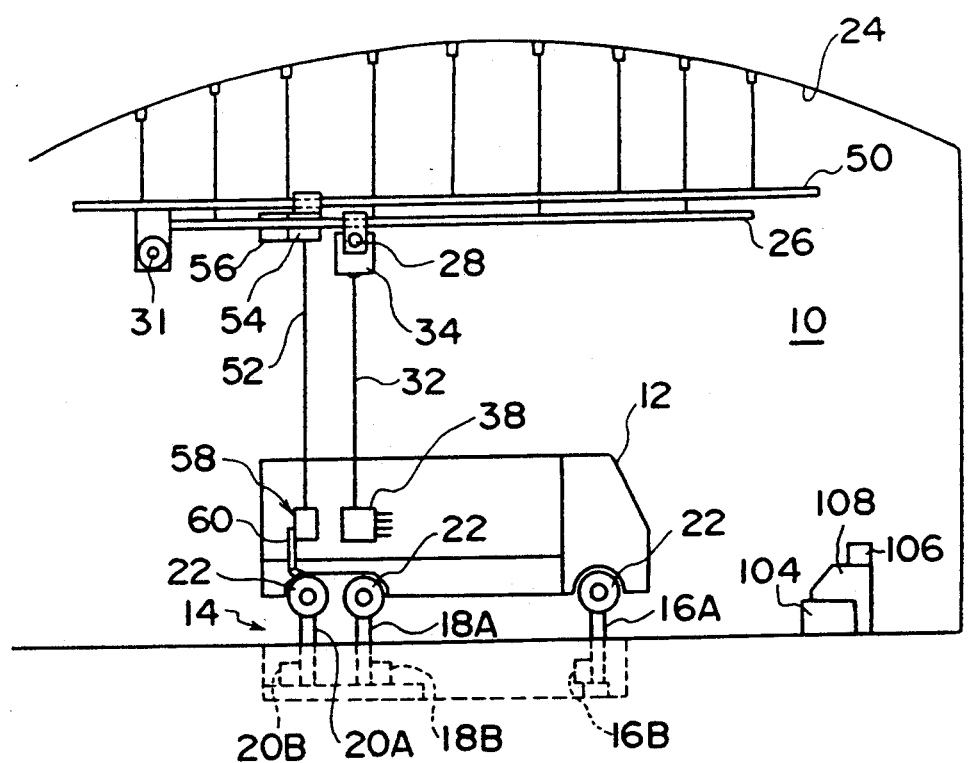
FIG. 2 is a side elevational view of the working area.

FIGS. 1 and 2 show a systematized working area 10 for tire demounting and mounting (hereinafter simply referred to as the working area 10).

This working area 10 serves as an area for tire demounting and mounting operations of a large vehicle 12 such as a truck or a bus. A three-column movable lift 14 is embedded in a central portion of a floor.

As shown in FIG. 2, the three-column movable lift 14 comprises three lifts 16A, 18A, 20A and elevators 16B, 18B, 20B for raising the lifts 16A, 18A, 20A, respectively. The lift 16A is fixed at a position corresponding to an axle for tires 22 of front wheels in a state in which the large vehicle 12 is brought to the central portion of the working area 10.

The remaining lifts 18A, 20A, together with the elevators 18B, 20B, are respectively movable in a horizontal direction so as to correspond to two axles for tires 22 of the rear wheels of the large vehicle 12. Namely, since the wheel base of the large vehicle 12 varies depending on the vehicle type, the lifts 18A, 20A are moved together with the elevators 18B, 20B so as to cope with different wheel bases. As a result, the three lifts 16A, 18A, 20A can be positioned at appropriate positions, respectively, thereby making it possible to jack up the large vehicle 12 safely.

A pair of fixed rails 26, which are mutually parallel and constitute portions of a first rail, are disposed on a ceiling 24 of the working area 10. These fixed rails 26 extend in such a manner that their longitudinal direction is parallel with the longitudinal direction of the large vehicle 12. In addition, the fixed rails 26, as viewed in a plan view, are respectively disposed in vicinities of the side surfaces of the large vehicle. A movable rail 28, which constitutes the first rail together with the fixed rails 26, extends between the fixed rails 26.

This movable rail 28 at one end thereof is coupled to a drive unit 30 via a chain. The drive unit 30 is fixed to an end of one of the fixed rails 26 and comprises a motor (not shown) for driving the movable rail 28 via the chain. The driving force of the drive unit 30 is transmitted to the other end of the movable rail 28 on the other fixed rail 26 side by means of a shaft 31. Consequently, as the drive unit 30 is operated, the movable rail 28 is moved along the fixed rails 26.

A movable block 34 is movably fixed to the movable rail 28, and a crawler type chain 32 is suspended from the movable block 34. This movable block 34 is movable along the movable rail 28 as a motor 36 is operated.

Namely, the movable block 34 is movable along the fixed rails 26 together with the movable rail 28, and is also movable relative to the movable rail 28 in a direction perpendicular to the longitudinal direction of the fixed rails 26. Thus, the movable block 34 is movable within an entire range covering the periphery of the large vehicle 12.

A four-shaft nut runner 38 is fixed to a lower end of the chain 32 suspended from the movable block 34.

Figure 3:
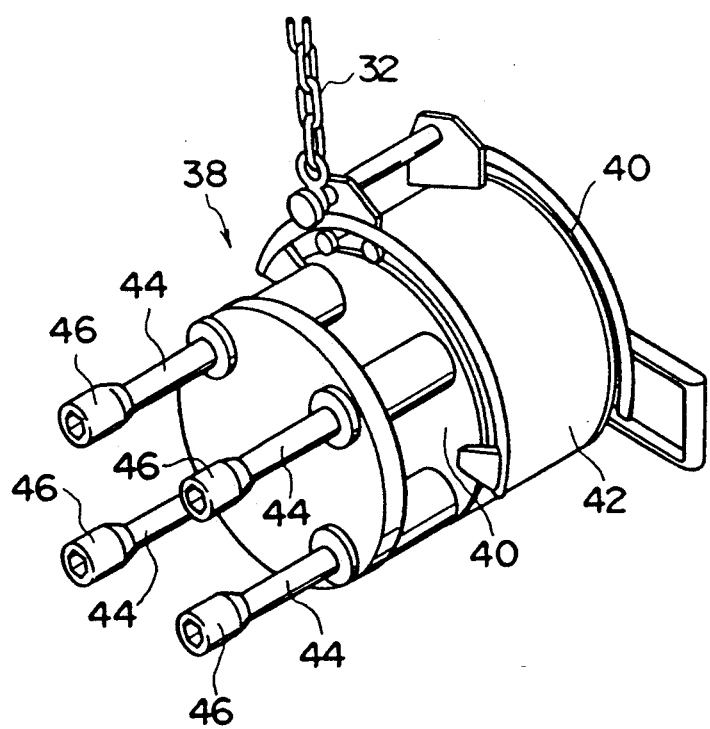
FIG. 3 is a perspective view of a nut runner.
Figure 4:
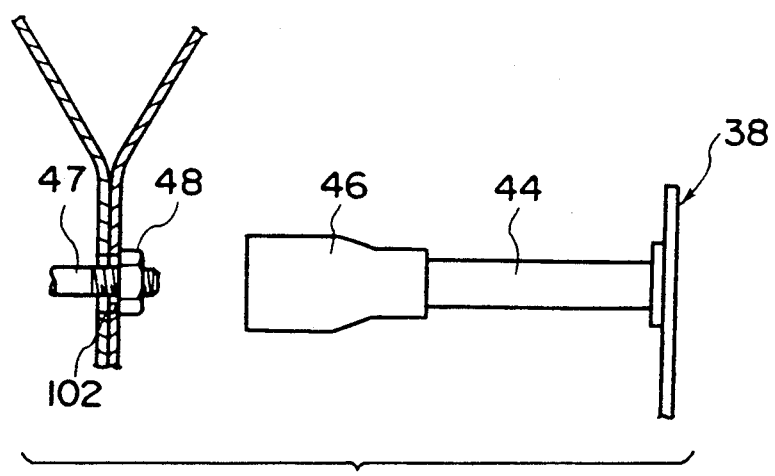
FIG. 4 is a cross-sectional view taken along line 4—4 of FIG. 6.

As shown in FIGS. 3 and 4, the four-shaft nut runners 38 are arranged such that four extension bars 44 project from a drive unit 42, sandwiched between a pair of disks 40, and project therefrom through one of the disks 40. A combination socket 46 is fixed to a distal end of each of the extension bars 44, and a pitch circle diameter of the combination sockets 46 is equal to a pitch circle diameter of wheel-mounting bolts (inner nuts in the case of a double tire, but a description will be given hereafter by referring to them as the bolts) 47, shown in FIG. 4, of the large vehicle 12. Here, the number of wheel-mounting nuts 48 of the large vehicle 12 is set to be eight. The pitch of the pitch circle of the combination sockets 46 is set to be twice as large as the pitch of the pitch circle of the wheel-mounting nuts 48. As a result, the combination sockets 46 can be fitted over every other wheel-mounting nut 48.

When the drive unit 42 is actuated, the respective combination sockets 46 are axially rotated in the same direction, and are capable of loosening the four wheel-mounting nuts 48 at a time.

As shown in FIGS. 1 and 2, an outer rail 50, which forms a rectangular loop and constitutes a second rail, is suspended from the ceiling 24 along an outer periphery of a loop-like path of movement of the movable block 34 which is moved along the fixed rails 26 and the movable rail 28.

A movable block 54 is movably fixed to the outer rail 50, and a crawler-type chain 52 is suspended from the movable block 54. The movable block 54 is movable along the outer rail 50 as a motor 56 is driven. Consequently, the movable block 54 is movable along the outer periphery of the large vehicle 12.

A hanger 58 is fixed to the chain 52 suspended from the movable block 54. The hanger 58 has a hook 60 which is capable of holding the tire 22 which has been removed from the large vehicle 12. The hanger 58 is movable around the large vehicle 12 in a state in which the tire is held by the hook 60.

As shown in FIG. 1, the movable blocks 34, 54 are respectively provided with sensors 62, 64. In addition, unillustrated stop point seals are respectively attached to the fixed rails 26, the movable rail 28, and the outer rail 50 at a plurality of predetermined positions (indicated by reference characters A-J in FIG. 1) in correspondence with the sensors 62, 64. The sensors 62, 64 are adapted to output signals upon detecting these stop point seals.

The sensors 62, 64 are respectively connected to a controller 66. The controller 66 comprises a microcomputer 68 which includes a CPU 70, a RAM 72, a ROM 74, I/O ports 76, and buses 78 such as data buses and control buses connecting them.

A signal line from an operation panel 80 is connected to the I/0 ports 76, and the stop points can be designated by operating this operation panel 80. In addition, the sensors 62, 64 are also connected to the I/O ports 76. Furthermore, the drive unit 30 for moving the movable rail 28 along the fixed rails 26, the motor 36 for driving the movable block 34, and the motor 56 for driving the movable block 54 are connected to the I/O ports 76 via drivers 82, 84, 86, respectively.

Positional relationships of the stop points are stored in advance in the RAM 72, so that a shortest distance of movement between two points can be selected by the CPU 70. For instance, in a case where the movable block 54 is moved from point D to point F on the outer rail 50, there is a difference in the distance of movement between the clockwise movement and the counterclockwise movement. For this reason, it is determined in this case that the clockwise movement gives the shortest distance, and the polarity of a power supply to the motor 56 is set accordingly.

It should be noted that, in this embodiment, in a case where the distance is equal in the case of the clockwise movement and in the case of the counterclockwise movement, a setting is provided such that the clockwise movement is selected.

As shown in FIG. 1, a standby position is set for the movable blocks 34, 54. In this embodiment, this standby position is located on a farther side of the working area 10, as viewed in the direction in which the large vehicle 12 is brought in, on the right-hand side of the vehicle. This position is stored in advance in the RAM 72, and the movable blocks 34, 54 are automatically moved to this standby position 88 in response to a signal indicating the completion of the operation. As for the movement to this standby position 88 as well, a shortest path of movement is selected by the CPU 70.

Figure 5:
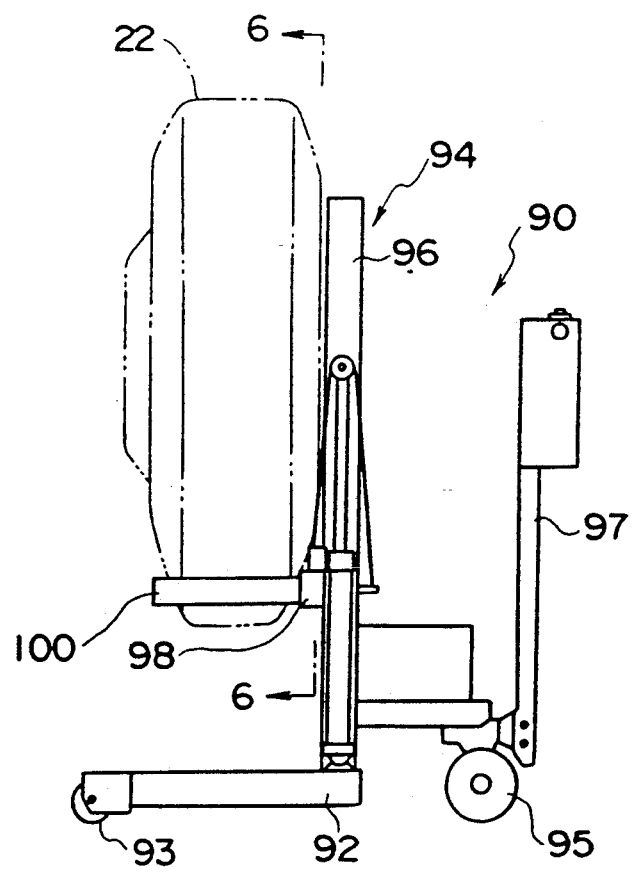
FIG. 5 is a side elevational view of a tire dolly.

A tire dolly 90 is disposed at the standby position 88. As shown in FIG. 5, which is a side elevational view, the tire dolly 90 is provided with castors 93 underneath a lower surface of a substantially rectangular base 92 as viewed in a plan view. In addition, the tire dolly 90 is provided with a tire 95 which is driven by a driving force of an unillustrated driving means. This tire 95 can be steered by a handle 97. As a result, the tire dolly 90 can be moved easily to a desired position in the working area 10.

A tire support 94 is provided on a base 92 of the tire dolly 90. The tire support 94 comprises a pair of columns 96 and a lifting portion 98 which can be raised or lowered along the columns 96.

The lifting portion 98 is provided with a pair of rollers 100. Here, if the tire dolly 90 is moved to allow the lifting portion 98 to be located below the tire 22 which is to be removed from the jacked-up large vehicle 12 (see FIG. 1), the tire 22 can be supported by the rollers 100.

Namely, in a state in which the tire 22 with all the wheel-mounting nuts 48 removed is supported on the lifting portion 98, if the tire dolly 90 is moved toward the outer rail 50, the tire 22 can be removed smoothly without interference between the wheel-mounting bolts 47 and wheel mounting holes 102 (see FIG. 4).

The tire dolly 90 serves to transport the tire 22 from the large vehicle 12 to the outer rail 50. In other words, the tire dolly 90 can transport the tire 22 without requiring the labor of the operator in the process of operations from the time when the tire 22 is removed until it is held by the hanger 58.

Figure 6:
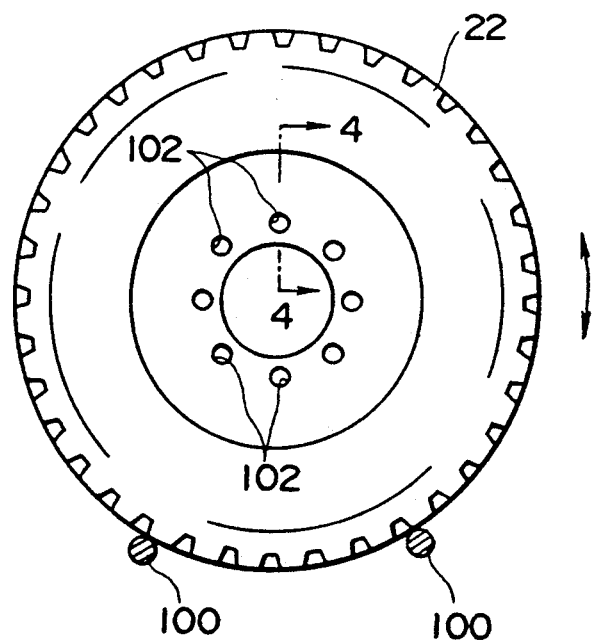
FIG. 6 is a cross-sectional view taken along line 6—6 of FIG. 5.

In addition, since the tire 22 is supported by the rollers 100, as shown in FIG. 6, the tire 22 can be axially rotated. This rotation of the tire 22 is effected when the wheel-mounting bolts 47 are positioned with respect to the wheel-mounting holes 102 when the tire 22 is fitted.

As shown in FIGS. 1 and 2, a tire changer 104, an inflator 106, and an safety enclosure 108 for an inflator, which are operating machines, are installed on the farther side of the working area 10, as viewed in the direction in which the large vehicle 12 is brought in. The positions where the tire changer 104, the inflator 106, and the safety enclosure 108 for an inflator are installed are made to correspond to the path of movement of the movable block 54 which is moved along the outer rail 50. Consequently, the tire 22 held by the hanger 58 can be transported directly to the tire changer 104, the inflator 106, or the safety enclosure 108 for an inflator.

The inflator 106 is disposed within the safety enclosure 108 for an inflator, and the inflation of the tire is carried out in a state in which the tire 22 is accommodated in the safety enclosure 108 for an inflator.

The operation of this embodiment will be described hereafter. A description will be given by citing as an example the operation of repairing a punctured tire.

The large vehicle 12 is guided and brought into the central portion of the working area 10. After it is set in position, the lifts 18A, 20A are positioned properly, the elevators 16B, 18B, 20B are driven to jack up the large vehicle 12.

The operator operates the tire dolly 90 located at the standby position, locates the lifting portion 98 below the tire 22 to be removed, and causes the lifting portion 98 to be raised until the rollers 100 of the lifting portion 98 are brought into contact with the tire 22.

Then, the operator operates the operation panel 80 to designate the stop points for the nut runner 38 and the hanger 58. Referring to the flowcharts shown in FIGS. 7 and 8, a description will be given hereafter of the operation from the time the stop points are designated until the nut runner 38 and the hanger 58 are moved.

Figure 7:
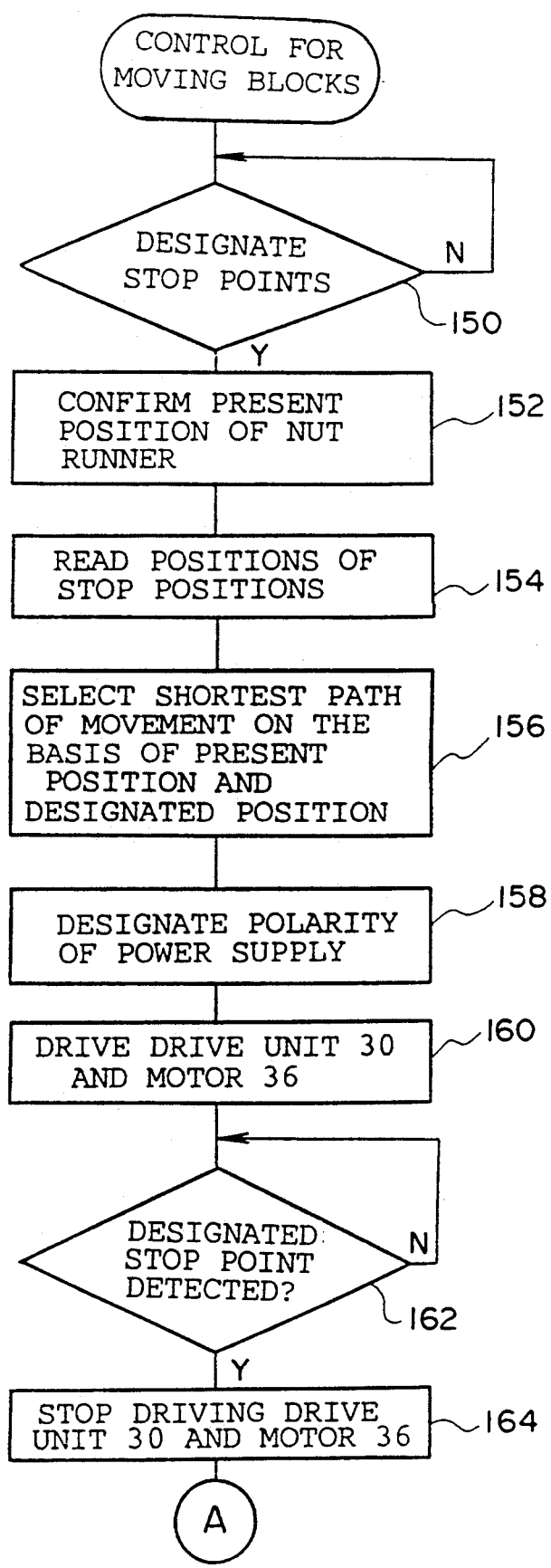
FIG. 7 is a flowchart for controlling the movement of a movable block 34.

In Step 150 in the flowchart of FIG. 7, when stop points are designated from the operation panel 80, the operation proceeds to Step 152 to confirm the present stop position of the nut runner 38. In Step 154, the positions of the respective stop points are read from the RAM 72 by the CPU 70. In Step 156, a shortest transport path is selected on the basis of the confirmed stop position and the designated stop point. The operation then proceeds to Step 158 to designate the direction of movement of the movable block 34 (designate the polarity of the power supply). It should be noted that the rotation of the motor 36 in forward and reverse directions may be changed over by means of a gear. In Step 160, the drive unit 30 and the motor 36 are driven on the basis of this designation, so as to move the movable block 34. For instance, if the nut runner 38 is at the standby position, and the designated stop point is the point J, it is determined that a shortest transport path is obtained by moving the movable block 34 clockwise, so that the power supply is supplied in such a manner as to move the movable block 34 clockwise.

When the movable block reaches the point J, in Step 162 the arrival is detected by the sensor 62, and the drive unit 30 and the motor 36 are stopped (Step 164).

Figure 8:
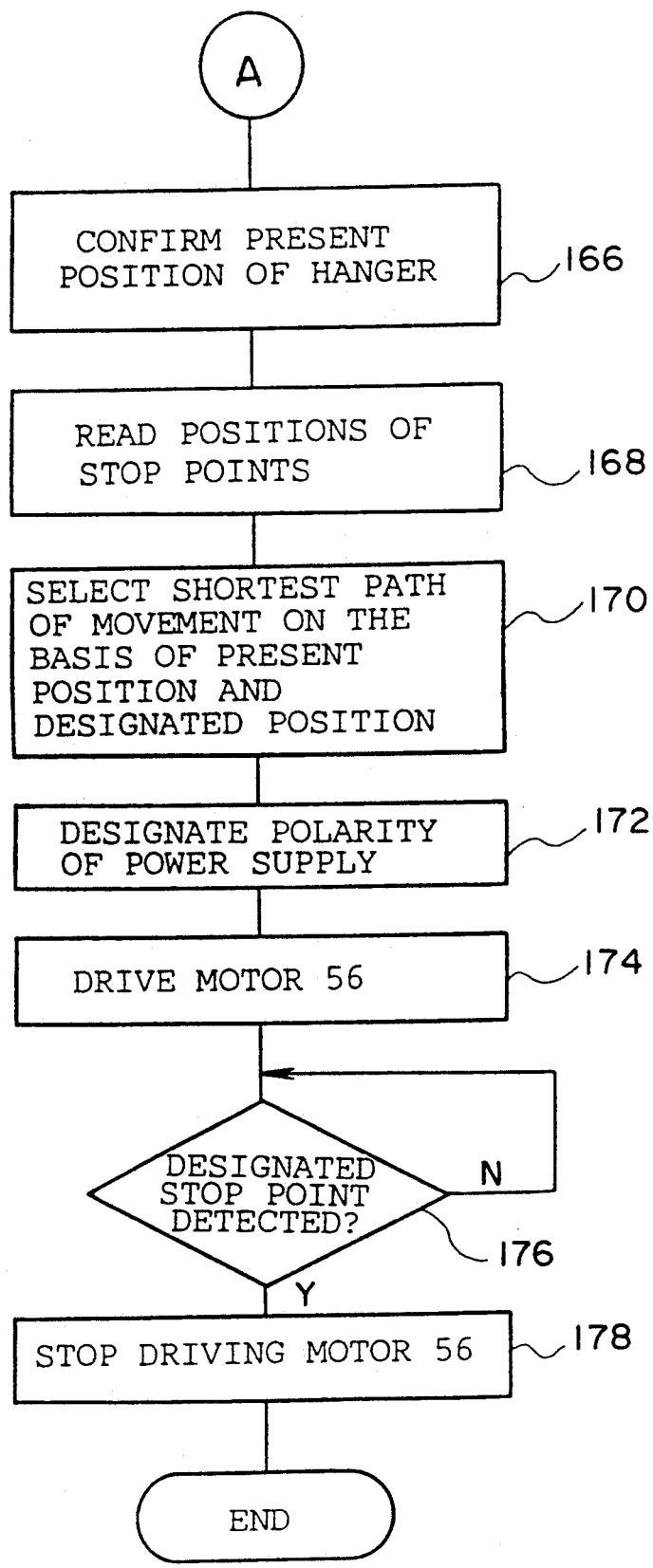
FIG. 8 is a flowchart for controlling the movement of a movable block 54, FIG. 8 being a continuation of FIG. 7.

Then, in Step 166 in the flowchart of FIG. 8, the present stop position of the hanger 58 is confirmed. In Step 168, the positions of the respective stop points are read from the RAM 72 by the CPU 70. In Step 170, a shortest transport path is selected on the basis of the confirmed stop position confirmed and the designated stop point. The operation then proceeds to Step 172 to designate the direction of movement of the movable block 54 (designate the polarity of the power supply). In Step 174, the motor 56 is driven on the basis of this designation, so as to move the movable block 54. For instance, if the hanger 58 is at the standby position, and the designated stop point is the point F, it is determined that a shortest transport path is obtained by moving the movable block 54 clockwise, so that the power supply is supplied in such a manner as to move the movable block 54 clockwise.

When the movable block reaches the point F, in Step 176 the arrival is detected by the sensor 64, and the motor 56 is stopped (Step 178).

The above-described is the control for moving the nut runner 38 and the hanger 58 to predetermined positions, whereby the movement of the nut runner 38 and the hanger 58 to positions closest to the tire 22 to be removed is completed.

Here, the operator first manually moves the nut runner 38 to the position of the tire 22 to be removed. At this time, since the movable rail 28 can be moved, and the movable block 34 can be made close to the large vehicle 12 along the movable rail 28, the nut runner 38 can be moved to the operating position in a state in which the chain 32, from which the nut runner 38 is suspended, is not inclined but suspended virtually downward.

The operator holds the nut runner 38, positions the four combination sockets 46 with respect to the wheel-mounting nuts 48, and drives the nut runner 38. The combination sockets 46 are first rotated in the same direction in an unloaded state, and when all the combination sockets 46 are fitted over the respective wheel-mounting nuts 48, a predetermined torque is applied to the combination sockets 46, thereby making it possible to loosen the wheel-mounting nuts 48.

After the four wheel-mounting nuts 48 are removed, the nut runner 38 is positioned with respect to the remaining four wheel-mounting nuts 48, and the above-described operation is repeated. Thus, since the four wheel-mounting nuts 48 can be removed simultaneously at a time, the nut runner 38 in accordance with this embodiment provides excellent operating efficiency.

The tire 22, from which all the wheel-mounting nuts 48 have been removed, is supported by the rollers 100 of the lifting portion 98 of the tire dolly 90, and the tire dolly 90 in this state is moved toward the outer rail 50. At this time, because the tire 22 is supported by the rollers 100 of the lifting portion 98, the tire 22 can be removed smoothly from the wheel-mounting bolts 47 without interference between the wheel-mounting bolts 47 and wheel-mounting holes 102.

The tire 22, which has been moved to the vicinity of the outer rail 50 by the tire dolly 90, is caused to be held by the hook 60 of the hanger 58. The hanger 58 is then lifted by driving the chain 52, and the movable block 54 is moved with the tire 22 removed from the tire dolly 90. At this time, a stop point to which the hanger 58 is to be moved is first designated. In this embodiment, since this is the case of repair of a punctured tire, the movable block 54 is first moved to the tire changer 104, so that the stop point D which is closest to the tire changer 104, as shown in FIG. 1, is designated. By means of this designation, the movable block 54 is moved on the basis of Steps 166 to 178 in the flowchart shown in FIG. 8, thereby making it possible to transport the tire 22.

Then, the operator operates a manual switch (not shown) to move the hanger 58 a short distance from the stop point D to the tire changer 104 to allow the tire 22 to be mounted on the tire changer 104.

Upon completion of the operation on the tire changer 104, the tire 22 is held again by the hanger 58, and is moved to the adjacent safety enclosure 108 for an inflator by operating the manual switch, so as to be accommodated in the safety enclosure 108 for an inflator. The inflator 106 is disposed in the safety enclosure 108 for an inflator, and the tire 22 accommodated in the safety enclosure 108 for an inflator is inflated by the inflator 106.

Upon completion of the inflation, the tire is held again by the hanger 58, and as the initially designated stop point is designated again, the tire 22 is moved automatically, and is mounted on the lifting portion 98 of the tire dolly 90.

Then, the tire dolly 90 is moved in the transverse direction of the large vehicle 12, and there are cases where the wheel-mounting bolts 47 are not aligned with the wheel-mounting holes 102. However, since the lifting portion 98 is provided with the rollers 100, the tire 22 can be axially rotated easily by the operator, so that the axes of the wheel-mounting bolts 47 can be easily aligned with the axes of the wheel-mounting holes 102. Hence, the tire 22 can be mounted again with ease.

Then, the operator holds the nut runner 38 and tightens the wheel-mounting nuts 48, thereby completing the repair of the punctured tire.

At this juncture, the lifts 16A, 18A, 20A of the three column movable lift 14 are lowered by being driven by the elevators 16B, 18B, 20B. By operating the operation panel 80, the nut runner 38 and the hanger 58 are automatically moved to the standby position 88 along the shortest paths of movement, and the tire dolly 90 is moved to the standby position 88 by the operator. Then, the large vehicle 12 is moved away from the working area 10.

As described above, in this embodiment, since cases where the operator holds the tire 22 in his or her arms or rolls the same are nil, his or her labor is alleviated by a remarkable degree, and the working clothes are prevented from becoming stained or damaged. In addition, since the transport of the large weight tire 22 is effected automatically, safety is ensured.

Furthermore, since the movement of the nut runner 38 and the hanger 58 to the stop points can be effected only by the operation of the operation panel 80, and by automatically selecting the shortest paths of movement, the operating efficiency improves.

Although, in the above-described embodiment, the operating procedure has been described by citing the repair of a puncture tire as an example, the replacement of the tire with a new one is effected by substantially identical operations. In addition, in a case where the rotation of tires is carried out, at least two tires 22 are removed during the same period. Accordingly, by using the safety enclosure 108 for an inflator as a temporary storage place for the tire 22, the operation can be facilitated.

Figure 9:
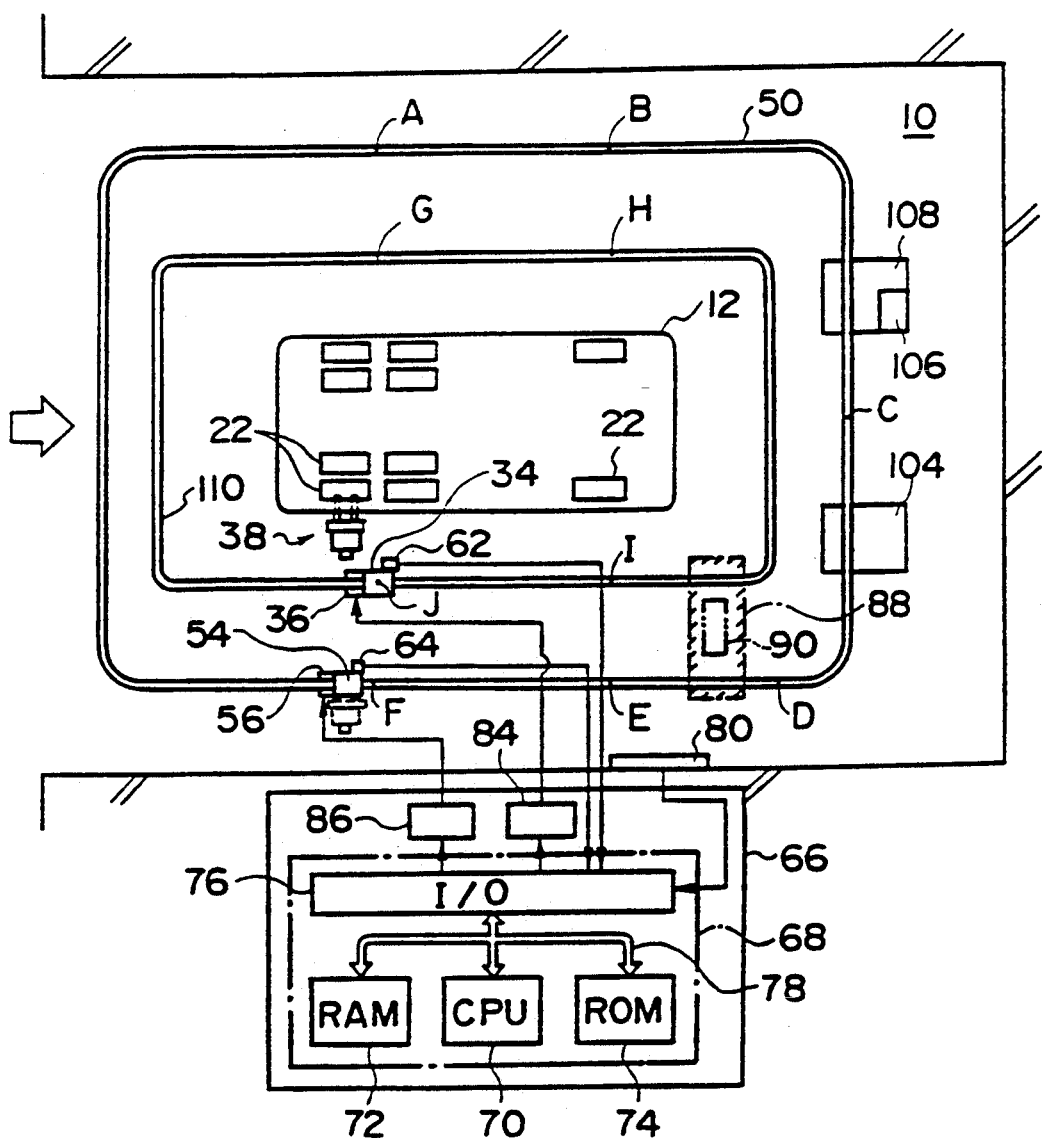
FIG. 9 is a plan view of the working area in a case where a first rail is arranged in the form of a rectangular loop.

In addition, although, in the above-described embodiment, the first rail is constituted by the fixed rails 26 and the movable rail 28, the first rail may be constituted by a rectangular-loop-like inner rail 110 arranged in the same way as the outer rail 50, as shown in FIG. 9. In this case, a plurality of nut runners 38 can be suspended therefrom and can be moved independently, which leads to the improved operating efficiency during the rotation of tires, in particular.

Furthermore, although, in the above-described embodiment, the nut runner 38 and the hanger 58 are automatically transported on the basis of the stop points, the nut runner 38 and the hanger 58 may be transported by the operation of an operation button, or may be moved by being manually pulled by the operator.

Although, in the above-described embodiment, the movable rail 28 is driven via the chain by the drive unit 30 fixed to an end of one of the fixed rails 26, the movable rail 28 may be made of a self propelled type by installing a motor directly in each coupling portion of the movable rail 28 with respect to the fixed rails 26.

What is claimed is:

1. A transport system for tire demounting and mounting service operations, which is installed in a working area where tire demounting and mounting services, including tire replacement, repair, inflation, and rotation of tires of a vehicle, are performed with operating machines, so as to transport the tire between the operating machines and the vehicle, said system comprising:
   a nut runner for rotating wheel-mounting nuts for demounting or mounting the tire of the vehicle;
   first guiding means located upwardly of the vehicle located in the working area and adapted to allow said nut runner to be moved to a position in which the tire of the vehicle can be demounted or mounted, by suspending said nut runner;
   a hanger for holding the tire removed from the vehicle by means of said nut runner and the tire to be mounted on the vehicle by means of said nut runner;
   second guiding means arranged around an outer periphery of said first guiding means and adapted to hold said hanger to render movable said hanger along an outer periphery of the vehicle; and
   a tire dolly disposed movably between the vehicle and said hanger and adapted to transport the tire removed from the vehicle by means of said nut runner and the tire to be mounted on the vehicle by means of said nut runner.

2. A transport system for tire demounting and mounting service operations according to claim 1, wherein said first guiding means has a first rail member, and said nut runner is moved along said first rail member.

3. A transport system for tire demounting and mounting service operations according to claim 2, wherein said first rail member comprises a pair of first fixed rails fixed in correspondence with both sides of the vehicle, respectively, and a first movable rail extending between said first fixed rails and disposed movably in a longitudinal direction of the vehicle.

4. A transport system for tire demounting and mounting service operations according to claim 2, wherein said first guiding means is formed in the shape of a loop.

5. A transport system for tire demounting and mounting service operations according to claim 1, wherein said second guiding means has a second rail member, and said hanger is moved along said second rail member.

6. A transport system for tire demounting and mounting service operations according to claim 5, wherein said second guiding means is formed in the shape of a loop.

7. A transport system for tire demounting and mounting service operations according to claim 1, wherein said tire dolly is located between said nut runner and the vehicle during demounting or mounting of the tire of the vehicle, and is disposed in such a manner as to allow said nut runner to tighten said nuts for securing the tire to the vehicle and loosen said nuts for demounting the tire from the vehicle.

8. A transport system for tire demounting and mounting service operations according to claim 1, wherein the operating machines are located alongside said second guiding means.

9. A transport system for tire demounting and mounting service operations according to claim 1, further comprising:
   first driving means for driving said nut runner along said first guiding means;
   second driving means for driving said hanger along said second guiding means;
   nut-runner-position detecting means for detecting that said nut runner has been moved to one of first-guiding-means stop points located on said first guiding means;
   hanger-position detecting means for detecting that said hanger has been moved to one of second-guiding-means stop points located on said second guiding means;
   designating means for designating the stop points for said nut runner and said hanger; and
   control means for controlling said first driving means and said second driving means for moving said nut runner and said hanger to the stop points designated by said designating means.

10. A transport system for tire demounting and mounting service operations according to claim 9, wherein said first driving means has a first motor for moving said first movable rail in the longitudinal direction of the vehicle.

11. A transport system for tire demounting and mounting service operations according to claim 9, wherein said first driving means has a second motor for moving said nut runner in a transverse direction of the vehicle.

12. A transport system for tire demounting and mounting service operations according to claim 9, wherein said nut-runner-position detecting means is a sensor member.

13. A transport system for tire demounting and mounting service operations according to claim 9, wherein said hanger-position detecting means is a sensor member.

14. A transport system for tire demounting and mounting service operations according to claim 9, wherein the operating machines are located alongside said second guiding means.

15. A transport system for tire demounting and mounting service operations according to claim 9, further comprising:

selecting means for selecting shortest paths of movement from present stop positions of said nut runner and said hanger to the stop points designated by said designating means.

16. A transport system for tire demounting and mounting service operations according to claim 15, wherein the operating machines are located alongside said second guiding means.

17. A transport system for tire demounting and mounting service operations, which is installed in a working area where tire demounting and mounting services, including tire replacement, repair, inflation, and rotation of tires of a vehicle, are performed with operating machines, so as to transport the tire between the operating machines and the vehicle, said system comprising:
   a nut runner for rotating wheel-mounting nuts for demounting or mounting the tire of the vehicle;
   a pair of first fixed rails located upwardly of the vehicle located in the working area and fixed in correspondence with both sides of the vehicle, respectively;
   a first movable rail for suspending said nut runner therefrom and extending between said first fixed rails, said first movable rail being adapted to move in a longitudinal direction of the vehicle so as to render said nut runner movable to a position where the tire of the vehicle can be demounted or mounted;
   a hanger for holding the tire removed from the vehicle by means of said nut runner and the tire to be mounted on the vehicle by means of said nut runner;
   a second fixed rail formed in the shape of a loop around outer peripheries of said first fixed rails and said first movable rail, and adapted to render said hanger movable along an outer periphery of the vehicle by holding said hanger;
   a tire dolly disposed movably between the vehicle and said hanger and adapted to transport the tire removed from the vehicle by means of said nut runner and the tire to be mounted on the vehicle by means of said nut runner;
   a first motor for driving said first movable rail in the longitudinal direction of the vehicle;
   a second motor for driving said nut runner in a longitudinal direction of said first movable rail;
   a third motor for driving said hanger along said second fixed rail;
   a nut-runner-position detecting sensor member for detecting that said nut runner has been moved to one of first-rail stop points located on said first fixed rails;
   a hanger-position detecting sensor member for detecting that said hanger has been moved to one of second-rail stop points located on said second fixed rail;
   designating means for designating the stop points for said nut runner and said hanger;
   selecting means for selecting shortest paths of movement from present stop positions of said nut runner and said hanger to the stop points designated by said designating means; and
   control means for controlling said first motor, said second motor, and said third motor for moving said nut runner and said hanger to the stop points designated by said designating means along the shortest paths of movement selected by said selecting means.

18. A transport system for tire demounting and mounting service operations according to claim 17, wherein the operating machines are located alongside said second guiding means.

19. A transport system for tire demounting and mounting service operations, which is installed in a working area where tire demounting and mounting services, including tire replacement, repair, inflation, and rotation of tires of a vehicle, are performed with operating machines, so as to transport the tire between the operating machines and the vehicle, said system comprising:

a nut runner for rotating wheel-mounting nuts for demounting or mounting the tire of the vehicle;

a first fixed rail located upwardly of the vehicle located in the working area, said first fixed rail being formed in the shape of a loop around an outer periphery of the vehicle, said nut runner being suspended from said first fixed rail and made movable to a position where the tire of the vehicle can be demounted or mounted;

a hanger for holding the tire removed from the vehicle by means of said nut runner and the tire to be mounted on the vehicle by means of said nut runner;

a second fixed rail formed in the shape of a loop around an outer periphery of said first fixed rail, and adapted to render said hanger movable along the outer periphery of the vehicle by holding said hanger;

a tire dolly disposed movably between the vehicle and said hanger and adapted to transport the tire removed from the vehicle by means of said nut runner and the tire to be mounted on the vehicle by means of said nut runner;

a first motor for driving said nut runner along said first fixed rail;

a second motor for driving said hanger along said second fixed rail;

a nut-runner-position detecting sensor member for detecting that said nut runner has been moved to one of first-rail stop points located on said first fixed rails;

a hanger-position detecting sensor member for detecting that said hanger has been moved to one of second-rail stop points located on said second fixed rail;

designating means for designating the stop points for said nut runner and said hanger;

selecting means for selecting shortest paths of movement from present stop positions of said nut runner and said hanger to the stop points designated by said designating means; and control means for controlling said first motor and said second motor for moving said nut runner and said hanger to the stop points designated by said designating means along the shortest paths of movement selected by said selecting means.

20. A transport system for tire demounting and mounting service operations according to claim 19, wherein the operating machines are located alongside said second guiding means.

* * * * *